(12) United States Patent
Gorny et al.

(10) Patent No.: US 6,713,181 B2
(45) Date of Patent: Mar. 30, 2004

(54) COMPOSITIONS CONTAINING POLYCARBONATE

(75) Inventors: Rüdiger Gorny, Krefeld (DE); Siegfried Anders, Köln (DE); Wolfgang Nising, St. Augustin (DE); Wolfgang Ebert, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/356,948

(22) Filed: Feb. 3, 2003

(65) Prior Publication Data

US 2003/0162025 A1 Aug. 28, 2003

(30) Foreign Application Priority Data

Feb. 5, 2002 (DE) .......................... 102 04 524

(51) Int. Cl.⁷ .............................. B32B 27/36
(52) U.S. Cl. .................... 428/412; 264/176.1; 264/219; 428/411.1; 528/196; 528/198
(58) Field of Search .............................. 264/176.1, 219; 428/411.1, 412; 528/196, 198

(56) References Cited

U.S. PATENT DOCUMENTS

| | | | | |
|---|---|---|---|---|
| 4,425,458 A | 1/1984 | Lindner et al. | ............. | 524/314 |
| 5,001,180 A | 3/1991 | Lundy et al. | ................ | 524/314 |
| 5,011,629 A | 4/1991 | Bilbo | .......................... | 260/405 |
| 5,108,835 A | 4/1992 | Hähnsen et al. | ............ | 428/334 |
| 5,238,985 A | 8/1993 | O'Lenick, Jr. | ................ | 524/30 |
| 6,306,962 B1 | 10/2001 | Pham et al. | .................... | 525/67 |
| 6,380,303 B1 * | 4/2002 | Ogoe et al. | .................... | 525/67 |

FOREIGN PATENT DOCUMENTS

EP 0 110 221 4/1987

* cited by examiner

*Primary Examiner*—Terressa Boykin
(74) *Attorney, Agent, or Firm*—Joseph C. Gil; Gary Matz; Aron Preis

(57) ABSTRACT

A thermoplastic molding composition is disclosed. The composition that contains a polymer selected from the group consisting of a polycarbonate, a transparent polycarbonate-polyester-blend, a copolyestercarbonate and a transparent polyester and a compound of formula (I)

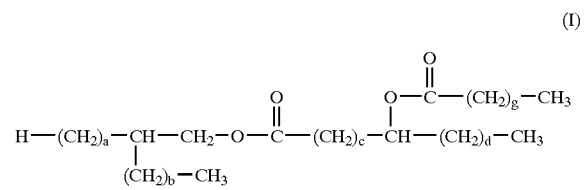

and one or more compounds of formula (II)

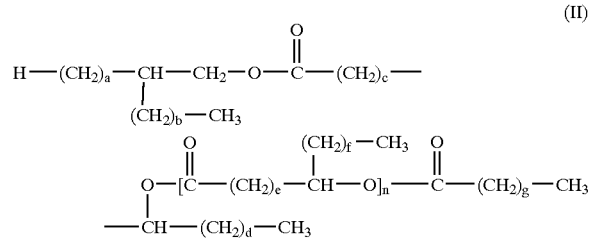

wherein a is 1 to 17, b is 0 to 16, c is 6 to 14, d is 3 to 7, e is 6 to 14, f is 3 to 7, g is 5 to 40 and a+b is 9 to 25 and n is 1 to 10, was found to be especially suitable for co-extrusion applications.

11 Claims, No Drawings

COMPOSITIONS CONTAINING POLYCARBONATE

FIELD OF THE INVENTION

The present invention relates to thermoplastic molding compositions and more particularly to compositions containing a polymer selected from the group consisting of a polycarbonate, a transparent polycarbonate-polyester-blend, a copolyestercarbonate and a transparent polyester.

SUMMARY OF THE INVENTION

A thermoplastic molding composition is disclosed. The composition that contains a polymer selected from the group consisting of a polycarbonate, a transparent polycarbonate-polyester-blend, a copolyestercarbonate and a transparent polyester and a compound of formula (I)

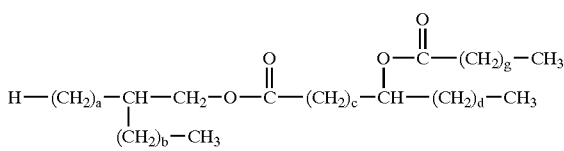

and one or more compounds of formula (II)

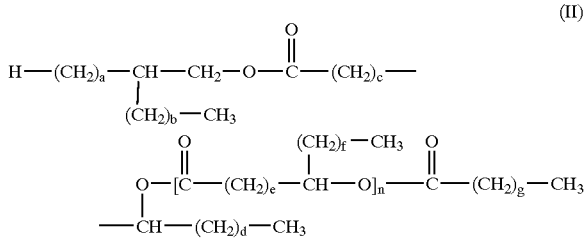

wherein a is 1 to 17, b is 0 to 16, c is 6 to 14, d is 3 to 7, e is 6 to 14, f is 3 to 7, g is 5 to 40 and a+b is 9 to 25 and n is 1 to 10, was found to be especially suitable for co-extrusion applications.

BACKGROUND OF THE INVENTION

Compositions containing polycarbonate are used in many fields. In particular, sheets made from compositions containing polycarbonates are used for roofing or glazing, for example. The compositions containing polycarbonate usually contain additional substances, for example, lubricants (also known as mold-release agents). Carboxylic acid esters, for example, are used as lubricants.

Compositions containing polycarbonate and Guerbet alcohols are known. Guerbet alcohols are the products of the Guerbet reaction and can be prepared by the Guerbet reaction, for example. The self-condensation of alcohols under the influence of sodium or copper at approximately 200° C. and at elevated pressure is known as the Guerbet reaction.

Polycarbonate sheets are known from EP A 0 110 221, for example, and are provided for a large number of applications. The sheets are produced, for example, by extrusion of compositions containing polycarbonate. Co-extrusion with further compositions which contain polycarbonate and which additionally have an elevated content of UV absorbers may optionally be carried out.

A problem that occurs repeatedly in the extrusion of such sheets is the deposition of volatile constituents from the composition on the calibrator (in the case of multi-wall sheets) or on the calender rolls (in the case of solid sheets), which can lead to faults on the surface of the sheets. Volatile constituents are, for example, UV absorbers, mold-release agents and other low molecular weight constituents of the composition.

EP A 0 320 632 describes co-extruded sheets made from polycarbonate-containing compositions which contain a UV absorber and may contain a lubricant. It is disadvantageous that, with a relatively long extrusion time, the surface of the sheets is impaired as a result of evaporations from the melt of the composition, particularly in the co-extrusion.

The increased evaporation of the UV absorber from the melt of the composition leads to the formation of a coating on the calibrator or the calender rolls and, ultimately, to the formation of faults in the surface of the sheet (e.g. white spots, ripples). At the calibrator, polycarbonate abrasion additionally leads to powdery deposits on the polycarbonate sheets.

Esters of Guerbet alcohols in polycarbonates are also known; for example, EP-A 0 390 994 describes polycarbonate-containing compositions which additionally contain particular fatty acid esters of Guerbet alcohols as mold-release agents.

In EP-A 0 390 994, no mention is made of the use of the molding compositions for co-extrusion. In addition, there is no mention that the mold-release agents according to the invention are suitable for co-extrusion applications together with larger amounts of UV absorbers.

The examples of WO 01/62851 and WO 01/25334 describe the use of Lubril J K, which is one of the embodiments of EP-A 0 390 994, in particular polycarbonate-ABS blends. In this case too, there is no mention of co-extrusion.

WO 01/74935 discloses that molding compositions containing esters of fatty acids and Guerbet alcohols and esters of fatty acids and linear alcohols have an improved performance in the coextrusion process.

The object of the present invention is, therefore, to provide compositions containing polycarbonate which do not exhibit the disadvantages of the prior art in the production of sheets by extrusion of those compositions.

DETAILED DESCRIPTION OF THE INVENTION

The object according to the invention is achieved by compositions containing a polymer selected from the group consisting of a polycarbonate, a transparent polycarbonate-polyester-blend, a copolyestercarbonate and a transparent polyester and a compound of formula (I)

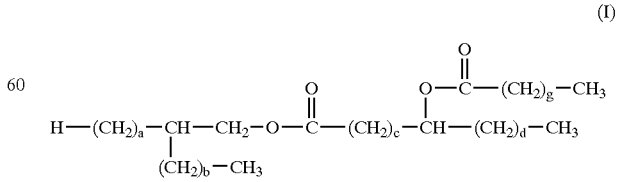

and one or more different compounds (a mixture of homologous compounds is preferred) of formula (II)

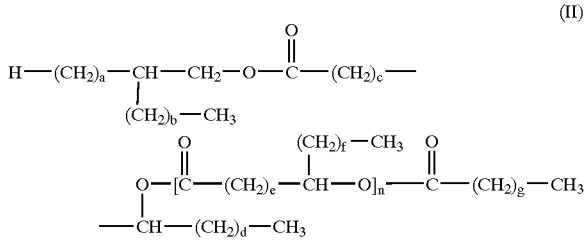

wherein in the preferred case the homologous compounds of formula (II) are distinguished by different values of n and wherein the following applies in respect of the compounds according to formula (I) and in respect of the compounds according to formula (II):

a=from 1 to 17,
b=from 0 to 16,
c=from 6 to 14,
d=from 3 to 7,
e=from 6 to 14,
f=from 3 to 7,
g=from 5 to 40 and
a+b=from 9 to 25 and wherein in the compounds according to formula (II) n=from 1 to 10, and wherein the ratio of the amount by weight of the compound according to formula (I) in the composition to the amount by weight of all the compounds according to formula (II) in the composition is preferably from 1:0.001 to 1:1.2.

The sum (I and II) of the amounts by weight of the compounds according to formula (I) and of the compounds according to formula (II) is preferably from 0.02 to 1.0 wt. %, particularly preferably from 0.1 to 0.5 wt. %.

The following preferably applies in respect of the compounds of the general formula I and of the general formula II:

a=from 2 to 14,
b=from 3 to 14,
c=10,
d=5,
e=10,
f=5,
g=from 14 to 16,
n=from 1 to 7,
a+b=from 9 to 25.

The ratio of the amount by weight of the compound according to formula I in the composition according to the invention to the amount by weight of all the compounds according to formula II in the composition according to the invention is from 1:0.001 to 1:1.2, preferably from 1:0.005 to 1:1.

A preferred embodiment of the present invention is given by the mentioned compositions according to the invention in which the amount by weight of the compound according to formula (II) wherein n=1 is from 0.5 to 1.2 times as great as the amount by weight of the compound according to formula (I), and the amount by weight of the compound according to formula (II) wherein n=2 is from 0.2 to 1.2 times as great as the amount by weight of the compound according to formula (I), and the amount by weight of the compound according to formula (II) wherein n=3 is from 0 to 1 times as great as the amount by weight of the compound according to formula (I), and the amount by weight of the compound according to formula (II) wherein n=4 is from 0 to 0.8 times as great as the amount by weight of the compound according to formula (I), and the amount by weight of the compound according to formula (II) wherein n=5 is from 0 to 0.5 times as great as the amount by weight of the compound according to formula (I), and the amount by weight of the compound according to formula (II) wherein n=6 is from 0 to 0.4 times as great as the amount by weight of the compound according to formula (I).

A preferred embodiment of the present invention is also given by the compositions according to the invention wherein the compositions additionally contain from 0.1 to 15 parts by weight of UV absorber. The UV absorber is preferably selected from the group consisting of (bis[2-hydroxy-5-tert-octyl-3-(benzotriazol-2-yl)phenyl]methane), 2-(4,6-diphenyl-1,3,5-triazin-2-yl)-5-(hexyl)oxy-phenol, 2-cyano-3,3-diphenyl-propenoic acid 2,2-bis[(2-cyano-1-oxo-3,3-diphenyl-2-propenyl)oxy]methyl-1,3-propanediyl ester.

A preferred embodiment of the present invention is also a composition according to the invention wherein the composition additionally contains from 10 to 3000 ppm, based on the total weight of the composition, thermal stabilizers. The thermal stabilizers are preferably selected from the group consisting of tris-(2,4-di-tert-butylphenyl) phosphate 3,9-bis[2,4-bis(1-methyl-1-phenylethyl)phenoxy]-2,4,8,10-tetraoxa-3,9-diphosphaspiro[5.5]undecane, 5-butyl-5-ethyl-2-[2,4,6-tris(1,1-dimethylethyl)phenoxy]-1,3,2-dioxaphosphorinane and triphenylphosphine.

The object according to the invention is also achieved by the use of the compositions according to the invention in the production of products of any kind. The production is preferably carried out by extrusion.

The object according to the invention is also achieved by products containing the compositions according to the invention. In a preferred embodiment, such products are single-layer or multi-layer sheets, wherein one or more of the layers of the sheets contains a composition according to the invention.

Preference is given to multi-layer sheets consisting of at least three layers, wherein one or both of the outer layers of the multi-layer sheets contains a composition according to the invention.

The compositions according to the invention additionally contain preferably from 0.1 to 15 parts by weight, particularly preferably from 1 to 15 parts by weight, most particularly preferably from 3 to 8 parts by weight, of UV absorbers.

The polycarbonate that is preferred according to the invention is bisphenol A homopolycarbonate.

The compositions according to the invention may contain further conventional processing aids, especially further mold-release agents and flow agents.

The compositions according to the invention may contain conventional stabilizers for polycarbonates, especially conventional thermal stabilizers.

The determination of the relative amounts by weight of the compounds according to formula I and formula II may be carried out by HPLC, for example.

Compounds of the general formula (I)

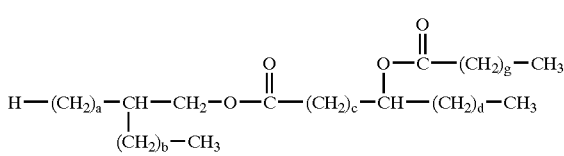

and compounds of the general formula (II)

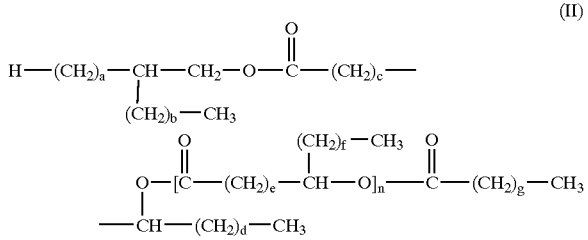

are available commercially. They are conventionally used in cosmetics. They may be obtained, for example, under the trade name Lubril J K from Rhodia (Rhodia GmbH, St ädelstrasse 10, D-60596 Frankfurt).

The compounds of formula (I) and the compounds of formula (II) may be prepared by known processes. For example, they may be prepared in the manner described in EP A 0 390 994.

Additives of formula (I) are available commercially, for example Lubril J K from Rhodia, and are normally used for cosmetics. They are typically present in admixture with compounds of formula (II).

The compositions according to the invention have proved to be particularly advantageous. They may be processed without difficulty and do not impair the goods obtained as the product. Surprisingly, it has been found that, when those compounds are used, the problems described at the beginning do not arise even when additives that are known to be volatile are added to compositions containing polycarbonate.

Thermoplastic, aromatic polycarbonates for the compositions according to the invention are homopolycarbonates, copolycarbonates and thermoplastic polyester carbonates. They preferably have weight average molecular weights $\overline{M}_w$ of from 18,000 to 40,000 g/mol, preferably from 26,000 to 36,000 g/mol and especially from 28,000 to 35,000 g/mol, determined by measuring the relative solution viscosity in dichloromethane or in mixtures of equal amounts by weight of phenol/o-dichlorobenzene calibrated by light scattering.

The melt viscosity of the compositions should preferably be less than that of the substrate to which they are applied, where multi-layer products are produced.

For the preparation of polycarbonates for the compositions according to the invention, reference is made, for example, to "Schnell", Chemistry and Physics of Polycarbonates, Polymer Reviews, Vol. 9, Interscience Publishers, New York, London, Sydney 1964, to D.C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75–90 (1980), to D. Freitag, U. Grigo, P. R. Müller, N. Nouvertne, BAYER A G, "Polycarbonates" in Encyclopedia of Polymer Science and Engineering, Vol. 11, Second Edition, 1988, pages 648–718, and finally to Dres. U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117–299. The preparation is preferably carried out by the interfacial polycondensation process or the melt transesterification process and is described by way of example with reference to the phase boundary process.

Compounds that are preferably to be used as starting materials are bisphenols of the general formula HO-Z-OH, wherein Z is a divalent organic radical having from 6 to 30 carbon atoms, which contains one or more aromatic groups. Examples of such compounds are bisphenols belonging to the group of the dihydroxydiphenyls, bis(hydroxyphenyl) alkanes, indanebisphenols, bis(hydroxyphenyl) ethers, bis (hydroxy-phenyl)sulfones, bis(hydroxyphenyl) ketones and α,α'-bis(hydroxyphenyl)-diisopropylbenzenes.

Particularly preferred bisphenols belonging to the above-mentioned groups of compounds are bisphenol A, tetraalkylbisphenol A, 4,4-(meta-phenylenediisopropyl) diphenol (bisphenol M), 4,4-(paraphenylene-diisopropyl) diphenol, 1,1-bis-(4-hydroxyphenyl)-3,3,5-trimethylcyclo-hexane (BP-TMC), and optionally mixtures thereof. Particular preference is given to homopolycarbonates based on bisphenol A and to copoly-carbonates based on the monomers bisphenol A and 1,1-bis-(4-hydroxy-phenyl)-3,3,5-trimethylcyclohexane. The bisphenol compounds to be used according to the invention are reacted with carbonic acid compounds, especially phosgene, or, in the case of the melt transesterification process, with diphenyl carbonate or dimethyl carbonate.

Polyester carbonates are obtained by reaction of the, above-mentioned bisphenols, at least one aromatic dicarboxylic acid and, optionally, carbonic acid equivalents. Suitable aromatic dicarboxylic acids are, for example, phthalic acid, terephthalic acid, isophthalic acid, 3,3'- or 4,4'-diphenyldicarboxylic acid and benzophenonedicarboxylic acids. It is possible for some, up to 80 mol %, preferably from 20 to 50 mol %, of the carbonate groups in the polycarbonates to be replaced by aromatic dicarboxylic acid ester groups.

Inert organic solvents used in the interfacial polycondensation process are, for example, dichloromethane, the various dichloroethanes and chloro-propane compounds, tetrachloromethane, trichloromethane, chloro-benzene and chlorotoluene. Chlorobenzene or dichloromethane or mixtures of dichloromethane and chlorobenzene are preferably used.

The interfacial polycondensation reaction may be accelerated by means of catalysts such as tertiary amines, especially N-alkylpiperidines or onium salts. Tributylamine, triethylamine and N-ethylpiperidine are preferably used. In the case of the melt transesterification process, the catalysts mentioned in DE-A 42 38 123 are used.

The polycarbonates may be branched in a deliberate and controlled manner by the use of small amounts of branching agents. Some suitable branching agents are: phloroglucinol, 4,6-dimethyl-2,4,6-tri-(4-hydroxy-phenyl)-2-heptene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]-propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2, 4-dihydroxyphenyl)-propane; hexa-(4-(4-hydroxyphenyl-isopropyl)-phenyl)-orthoterephthalic acid ester; tetra-(4- hydroxyphenyl)-methane; tetra-(4-(4-hydroxyphenyl-isopropyl)-phenoxy)-methane; α,α',α"-tris-(4-hydroxyphenyl)-1,3,5-triisopropylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)-methyl)-benzene and especially: 1,1,1-tri-(4-hydroxyphenyl)-ethane and bis-(3-methyl-4-hydroxyphenyl)-2-oxo-2,3-dihydroindole.

The from 0.05 to 2 mol %, based on diphenols used, of branching agents or mixtures of branching agents that are optionally to be used concomitantly may be used together with the diphenols or, alternatively, may be added at a later stage of the synthesis.

Chain terminators may be employed. There are used as chain terminators preferably phenols, such as phenol, alkylphenols, such as cresol and 4-tert-butylphenol, chlorophenol, bromophenol, cumylphenol, or mixtures thereof, in amounts of from 1 to 20 mol %, preferably from 2 to 10 mol %, per mol of bisphenol. Phenol, 4-tert-butylphenol and cumylphenol are preferred.

Chain terminators and branching agents may be added to the syntheses separately or alternatively together with the bisphenol.

The compositions according to the invention are also referred to as co-extrusion compositions.

The preparation of the polycarbonates for the co-extrusion compositions according to the invention by the melt transesterification process is described by way of example in DE-A 42 38 123.

The compositions according to the invention may also contain UV absorbers.

Suitable UV absorbers for the co-extrusion compositions according to the invention are preferably those compounds which, owing to their absorption capacity below 400 nm, are capable of effectively protecting polycarbonate from UV light and which have a molecular weight greater than 370, preferably of 500 or more.

Examples of UV absorbers which may be used in accordance with the invention are described hereinbelow.

a) Dimeric Benzotriazole Derivatives According to Formula (II)

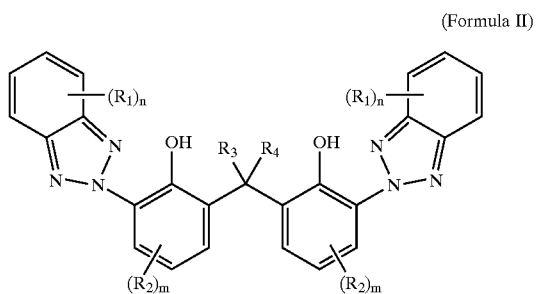

(Formula II)

In formula (II), $R^1$ and $R^2$ are identical or different and represent H, halogen, $C_1$-$C_{10}$-alkyl, $C_5$-$C_{10}$-cycloalkyl, $C_7$-$C_{13}$-aralkyl, $C_6$-$C_{14}$-aryl, —$OR^5$ or —(CO)—O—$R^5$, wherein $R^5$=H or $C_1$-$C_4$-alkyl.

In formula (II), $R^3$ and $R^4$ are likewise identical or different and represent H, $C_1$-$C_4$-alkyl, $C_5$-$C_6$-cycloalkyl, benzyl or $C_6$-$C_{14}$-aryl.

In formula (II), m represents 1, 2 or 3 and n represents 1, 2, 3 or 4.

Preference is given to Tinuvin 360, wherein $R^1$=$R^3$=$R^4$=H; n=4; $R^2$=1,1,3,3-tetramethylbutyl; m=1.

Preferred ranges: from 0.00001 to 1.5 wt. % and from 2 to 20 wt. %, particularly preferably from 0.01 to 1.0 wt. % and from 3 to 10 wt. %, most particularly preferably from 0.1 to 0.5 wt. % and from 4 to 8 wt. %.

a2) Dimeric Benzotriazole Derivatives According to Formula (III)

Formula (III)

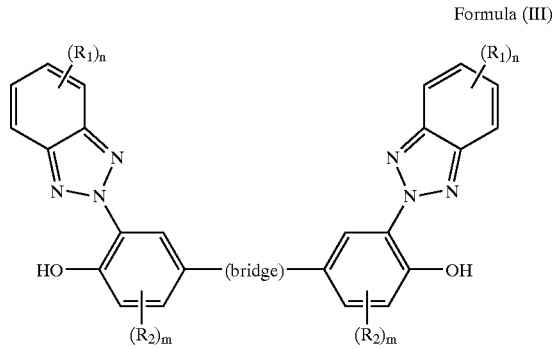

wherein the bridge represents

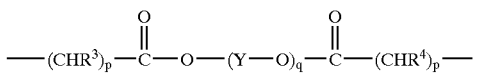

$R_1$, $R_2$, m and n are as defined for formula (II), and wherein p is an integer from 0 to 3, q is an integer from 1 to 10, Y is —$CH_2$—$CH_2$—, —$(CH_2)_3$—, —$(CH_2)_4$—, —$(CH_2)_5$—, —$(CH_2)_6$— or $CH(CH_3)$—$CH_2$—, and $R^3$ and $R^4$ are as defined for formula (II).

Preference is given to Tinuvin 840, wherein $R^1$=H; n=4; $R^2$=tert-butyl, m=1; $R^2$ is attached in the ortho-position with respect to the OH group; $R^3$=$R^4$=H; p=2; Y=—$(CH_2)_5$—; q=1.

Preferred ranges: from 0.00001 to 1.5 wt. % and from 2 to 20 wt. %, particularly preferably from 0.01 to 1.0 wt. % and from 3 to 10 wt. %, most particularly preferably from 0.1 to 0.5 wt. % and from 4 to 8 wt. %.

b) Triazine Derivatives According to Formula (IV)

Formula (IV)

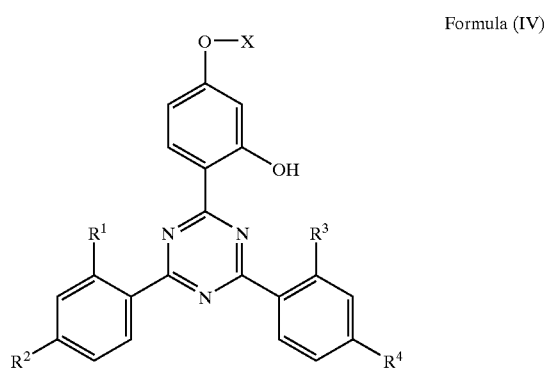

wherein $R^1$, $R^2$, $R^3$, $R^4$ in formula (IV) are identical or different and are H or alkyl or CN or halogen or O-alkyl, and X is alkyl.

Preference is given to Tinuvin 1577, wherein $R^1$=$R^2$=$R^3$=$R^4$=H; X=hexyl; Cyasorb UV-1164, wherein $R^1$=$R^2$=$R^3$=$R^4$=methyl; X=octyl.

Preferred ranges: from 0.00001 to 1.0 wt. % and from 1.5 to 10 wt. %, particularly preferably from 0.01 to 0.8 wt. % and from 2 to 8 wt. %, most particularly preferably from 0.1 to 0.5 wt. % and from 3 to 7 wt. %.

c) Triazine Derivatives of the Following Formula (IVa)

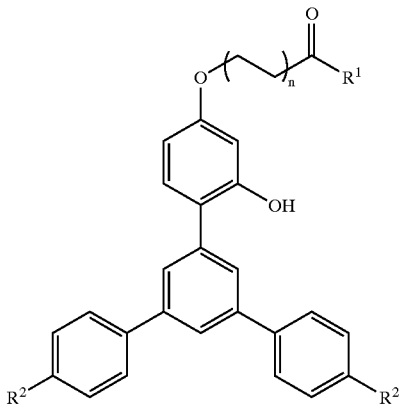

Formula (IVa)

wherein
$R^1$ represents from $C_1$-alkyl to $C_{17}$-alkyl,
$R^2$ represents H or from $C_1$-alkyl to $C_4$-alkyl, and
n is from 0 to 20.

Preferred ranges: from 0.00001 to 1.0 wt. % and from 1.5 to 10 wt. %, particularly preferably from 0.01 to 0.8 wt. % and from 2 to 8 wt. %, most particularly preferably from 0.1 to 0.5 wt. % and from 3 to 7 wt. %.

d) Diaryl Cyanoacrylates of Formula (V)

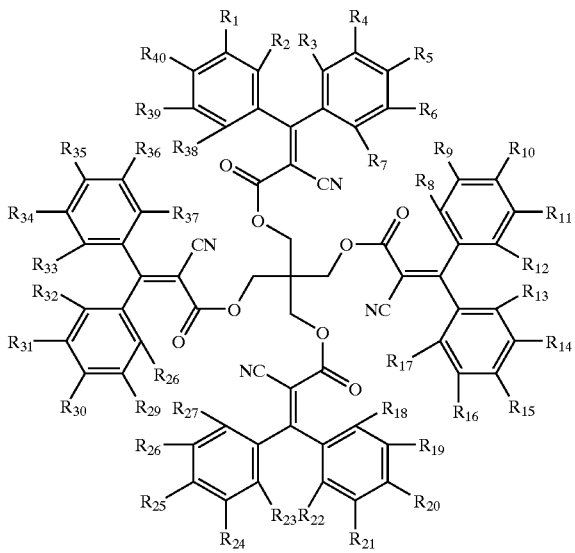

Formula (V)

wherein $R_1$ to $R_{40}$ may be identical or different and represent H, alkyl, CN or halogen.

Preference is given to Uvinul 3030, wherein $R_1$ to $R_{40}$=H.

Preferred ranges: from 0.00001 to 1.5 wt. % and from 2 to 20 wt. %, particularly preferably from 0.01 to 1.0 wt. % and from 3 to 10 wt. %, most particularly preferably from 0.1 to 0.5 wt. % and from 4 to 8 wt. %.

e) Also Suitable are the UV Absorbers Mentioned in Claim 1 of U.S. Pat. No. 5,959,012.

The incorporation of the UV absorbers into the sheet compositions according to the invention that are to be used is carried out by conventional methods, for example by mixing solutions of the UV absorbers with solutions of the plastics in suitable organic solvents, such as $CH_2Cl_2$, haloalkanes, haloaromatic compounds, chlorobenzene and xylenes. The mixtures of substances are then homogenised in a known manner by extrusion; the solution mixtures are removed, for example compounded, in a known manner by evaporation of the solvent and subsequent extrusion.

Suitable stabilizers for the polycarbonates for the compositions according to the invention are, for example, phosphines, phosphites or Si-containing stabilizers, and other compounds described in EP-A 0 500 496. There may be mentioned by way of example triphenyl phosphites, diphenylalkyl phosphites, phenyldialkyl phosphites, tris-(nonylphenyl) phosphite, tetrakis-(2,4-di-tert-butylphenyl)-4,4'-biphenylene diphosphonite and triaryl phosphite. Triphenylphosphine and tris-(2,4-di-tert-butylphenyl) phosphite are particularly preferred.

Examples of antistatics are cationic compounds, for example quaternary ammonium, phosphonium or sulfonium salts, anionic compounds, for example alkylsulfonates, alkyl sulfates, alkyl phosphates, carboxylates in the form of alkali metal or alkaline earth metal salts, non-ionic compounds, for example polyethylene glycol esters, polyethylene glycol ethers, fatty acid esters, ethoxylated fatty amines. Preferred antistatics are non-ionic compounds.

All the materials and solutions used for the synthesis of the compositions according to the invention may be contaminated with corresponding impurities as a result of their preparation and storage, the aim being to work with starting materials that are as clean as possible.

The individual constituents may in a known manner be mixed either in succession or simultaneously, either at room temperature or at elevated temperature.

Incorporation of the additives into the compositions according to the invention is preferably carried out in a known manner by mixing polymer granules with the additives at temperatures of approximately from 200 to 380° C. in conventional apparatuses such as internal kneaders, single-screw extruders and double-shaft extruders, for example by melt compounding or melt extrusion, or by mixing the solutions of the polymer with solutions of the additives and subsequently evaporating off the solvents in a known manner. The amount of additives in the composition may be varied within wide limits and is dependent on the desired properties of the molding composition. The total amount of additives in the composition is approximately up to 20 wt. %, preferably from 0.2 to 12 wt. %, based on the weight of the compositions.

As is shown by the Examples according to the invention, the use of the composition according to the invention offers a significant advantage on any desired polycarbonate molding compositions as the base material. Especially, however, when the base material of the sheet is also provided with the mold-release agent of the composition according to the invention.

The invention therefore also provides molded articles which have been produced with the concomitant use of the compositions according to the invention. The compositions may be used in the production of solid sheets and so-called multi-wall sheets (e.g. twin-wall sheets). The sheets also include sheets that have on one side or on both sides an additional cover layer containing the composition according to the invention having an elevated UV absorber content.

The compositions according to the invention permit the facilitated production of products, especially of sheets and products produced therefrom, such as, for example, glazing for greenhouses, conservatories, bus stops, advertising hoardings, signs, safety glazing, motor vehicle glazing, windows and roofing.

Subsequent treatment of products coated with the composition according to the invention, such as, for example, deep-drawing or surface treatments such as, for example, the provision of scratch-resistant lacquers, water-spreading layers and the like, is possible, and the patent relates also to the products produced by such processes.

Co-extrusion as such is known in the literature (see, for example, EP-A 0 110 221 and EP-A 0 110 238). In the present case, the procedure is preferably as follows:

Extruders for producing the core layer and cover layer(s) are attached to a co-extrusion adapter. The adapter is so designed that the melt forming the cover layer(s) is applied in the form of a thin layer that adheres to the melt of the core layer.

The multi-layer molten extrudate so produced is then brought into the desired form (multi-wall or solid sheet) in the die connected downstream. Then, in a known manner, by means of calendering (solid sheet) or vacuum calibration (multi-wall sheet), the melt is cooled and subsequently cut to length under controlled conditions. A tempering oven for the elimination of stresses may optionally be provided downstream of the calibration. Instead of the adapter provided upstream of the die, the die itself may be in such a form that combination of the melts takes place therein.

The invention is explained further by means of the following example.

EXAMPLE 10 mm twin-wall sheets A, B and C, as are described, for example, in EP-A 0 110 238, were obtained from the following compositions: The base material used was Makrolon® 1243 (branched bisphenol A polycarbonate from Bayer A G, Leverkusen having a melt flow index (MFR) according to ISO 1133 of 6.5 g/10 min at 300° C. and a 1.2 kg load). The base material was co-extruded with the compounds shown in the Table based on Makrolone® 3100 (linear bisphenol A polycarbonate from Bayer A G, Leverkusen having a melt flow index (MFR) according to ISO 1133 of 6.5 g/10 min at 300° C. and a 1.2 kg load).

The thickness of the co-ex layer is in each case approximately 50 μm.

| Sheet | UV absorber | Mold-release agent | Further additives |
|---|---|---|---|
| A | 5% Tinuvin360 | 0.2% 2-octyldodecyl-12-stearoyl stearate*) | — |
| B | 5% Tinuvin360 | 0.25% PETS***) | — |
| C | 5% Tinuvin360 | 0.3% acc. to the invention**) | — |
| D | 5% Tinuvin360 | 0.2% acc. to the invention**) | — |
| E | 5% Tinuvin360 | 0.3% acc. to the invention**) | 0.04% Irgafos 168****) |
| F | 3.5% Tinuvin1577 | 0.2% acc. to the invention**) | — |
| G | 5% Uvinul3030 | 0.2% acc. to the invention**) | — |
| H | 5% Tinuvin360 | 0.2%*****) | — |

*)100% according to formula (I) with: a = 6, b = 7, c = 10, d = 5, g = 16, no compound according to formula (II) with n > 0, commercially available, Ceraphyl ® 847 from ISP, 1361 Alps Road, Wayne, NY 07470 USA
**)Commercially available, Lubril ® JK from Rhodia, (Rhodia GmbH, Stadelstraβe 10, D-60569 Frankfurt, Germany)
***)Commercially available, Loxiol ® VPG 861 from Cognis, Düsseldorf, Germany (PETS = pentaerythritol tetrastearate)
****)Tris-(2,4-di-tert-butylphenyl)phosphate, commercially available from Ciba Spezialitätenchemie, Lampertheim, Germany
*****)according to formula (I) with: a = 6, b = 7, c = 10, d = 5, g = 16, according to formula (II) with: a = 6, b = 7, c = 10, d = 5, g = 16, e = 10, f = 5, n = 1, ratio of compound according to formula (I) to compound according to formula (II) = 1:1.4; prepared as disclosed in EP-A 0 390 994

The machines and apparatuses used to produce multi-layer sheets are described below:

The device consisted of
  the main extruder having a screw of length 33 D and a diameter of 70 mm with degassing
  the co-ex adapter (feedblock system)
  a co-extruder for applying the cover layer having a screw of length 25 D and a diameter of 30 mm
  the special sheet die having a width of 350 mm
  the calibrator
  the roller conveyor
  the take-off device
  the device for cutting to length (saw)
  the delivery table.

The polycarbonate granules of the base material were fed to the feeding funnel of the main extruder, and the UV co-extrusion material was fed to that of the co-extruder. Melting down and feeding of the material in question took place in the respective cylinder/screw plastification system. The two material melts were brought together in the co-exadapter and, after leaving the die and cooling in the calibrator, form a composite. The other devices served to transport the extruded sheets, cut them to length and deposit them.

Co-extrusion with A (Reference)
  first relatively small deposits after 4 hours
  after 90 minutes, slight transverse ripples which occur at irregular intervals and impair the quality of the sheets slightly. After 4½ hours, slightly more pronounced transverse ripples.
  Rating: good
Co-extrusion with B (Reference)
  first relatively small faults after 50 minutes (transverse ripples)
  after 90 minutes, larger faults (warping of walls, white deposits, transverse ripples)
  Rating: poor
Co-extrusion with C
  no deposits over a test duration of 5 hours
  Transverse rippling is so slight that the quality of the sheets is not impaired
  Rating: very good
Co-extrusion with D
  no deposits over a test duration of 5 hours
  after 90 minutes, slight transverse ripples which occur at irregular intervals and impair the quality of the sheets slightly
  Rating: very good
Co-extrusion with E
  no deposits over a test duration of 5 hours
  Transverse rippling is so slight that the quality of the sheets is not impaired
  Rating: very good
Co-extrusion with F
  no deposits over a test duration of 5 hours
  after 90 minutes, slight transverse ripples which occur at irregular intervals and impair the quality of the sheets slightly
  Rating: very good
Co-extrusion with G
  no deposits over a test duration of 5 hours
  Transverse rippling is so slight that the quality of the sheets is not impaired
  Rating: very good
Co-extrusion with H (Reference)
  first relatively small faults after 35 minutes (transverse ripples)

after 60 minutes, larger faults (warping of walls)

Rating: poor

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition consisting essentially of polycarbonate and a compound of formula (I)

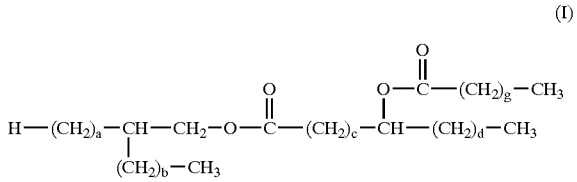

and one or more different compounds of formula (II)

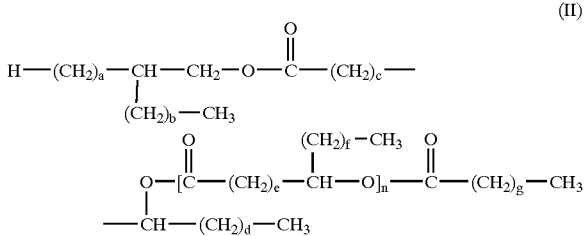

wherein
   a is 1 to 17, b is 0 to 16, c is 6 to 14, d is 3 to 7,
   e is 6 to 14, f is 3 to 7, g is 5 to 40 and a+b is 17 and n is 1 to 10,
   and 0.1 to 15 percent by weight of a UV absorber, the percent being relative to the weight of the composition
   and optionally a thermal stabilizer in an amount of 10 to 3000 ppm relative to the total weight of the composition.

2. The composition according to claim 1 wherein the weight ratio of the compound of formula (I) to the compounds of formula (II) is from 1:0.001 to 1:1.2.

3. The composition according to claim 1, wherein the compound conforming to formula (II) wherein n=1 is present in an amount of 0.5 to 1.5 times as great as the amount by weight of the compound according to formula (I), and the compound conforming to formula (II) wherein n=2 is present in an amount of 0.2 to 1.2 times as great as the amount by weight of the compound according to formula (I), and the compound conforming to formula (II) wherein n=3 is present in an amount of 0 to 1 times as great as the amount by weight of the compound according to formula (I), and the compound conforming to formula (II) wherein n=4 is present in an amount of 0 to 0.8 times as great as the amount by weight of the compound according to formula (I), and the compound conforming to formula (II) wherein n=5 is present in an amount of 0 to 0.5 times as great as the amount by weight of the compound according to formula (I), and the compound conforming to formula (II) wherein n=6 is present in an amount of 0 to 0.4 times as great as the amount by weight of the compound according to formula (I).

4. The composition of claim 1 wherein the total amount of compounds conforming to formula (I) and to formula (II) is from 0.02 to 1.0% relative to the weight of the composition.

5. The composition according to claim 1, wherein the UV absorber is a member selected from the group consisting of (bis[2-hydroxy-5-tert-octyl-3-(benzotriazol-2-yl)phenyl] methane), 2-(4,6-diphenyl-1,3,5-triazin-2-yl)-5-(hexyl)oxy-phenol and 2-cyano-3,3-diphenyl-propenoic acid 2,2-bis[(2-cyano-1-oxo-3,3-diphenyl-2-propenyl)oxy]methyl-1,3-propanediyl ester.

6. The composition according to claim 1, wherein the thermal stabilizer is selected from the group consisting of tris-(2,4-di-tert-butylphenyl) phosphate and triphenylphosphine.

7. A process of preparing an article comprising extruding the composition according to claim 1.

8. The article prepared by the process of claim 7.

9. The article according to claim 8 selected from the group consisting of glazing, greenhouses, conservatories, bus stops, advertising hoardings, signs, safety glazing, motor vehicle glazing, windows, roofing, solid sheets, corrugated sheets, multi-wall sheets and multi-wall profiles.

10. A molded article comprising the composition of claim 1.

11. A multi-layer sheet containing at least three layers wherein one or both of the outer layers contains the composition according claim 1.

* * * * *